S. C. BAUCUM.
ANTIFRICTION FIFTH WHEEL.
APPLICATION FILED AUG. 9, 1910.
976,620.
Patented Nov. 22, 1910.
3 SHEETS—SHEET 1.
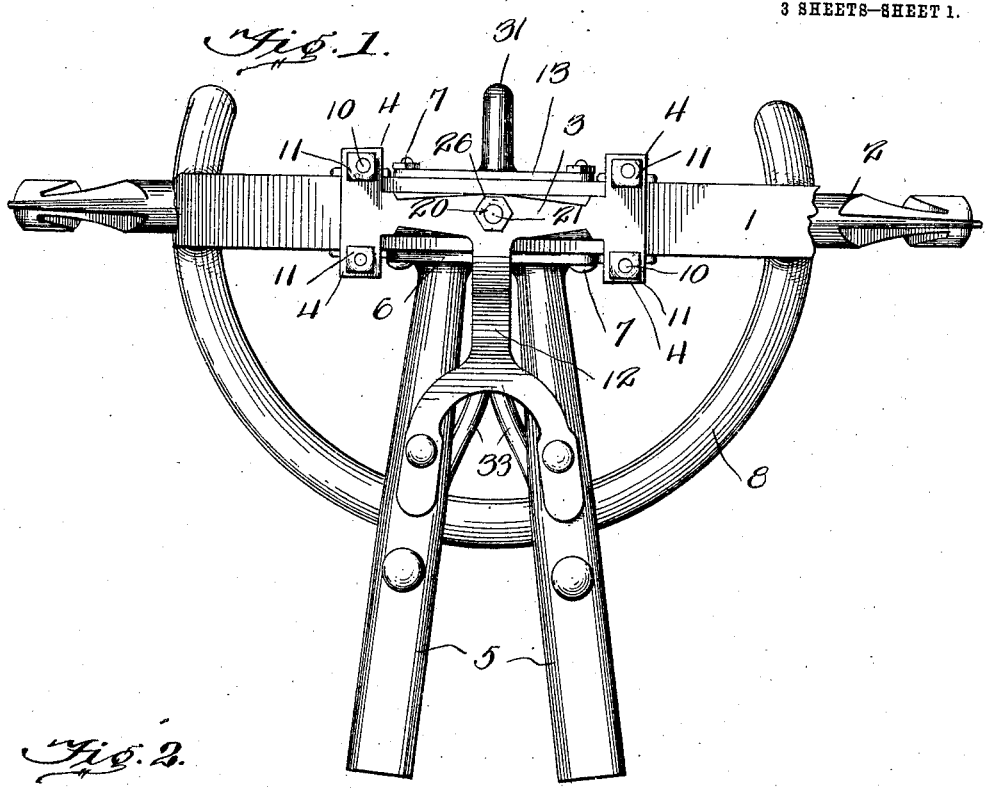
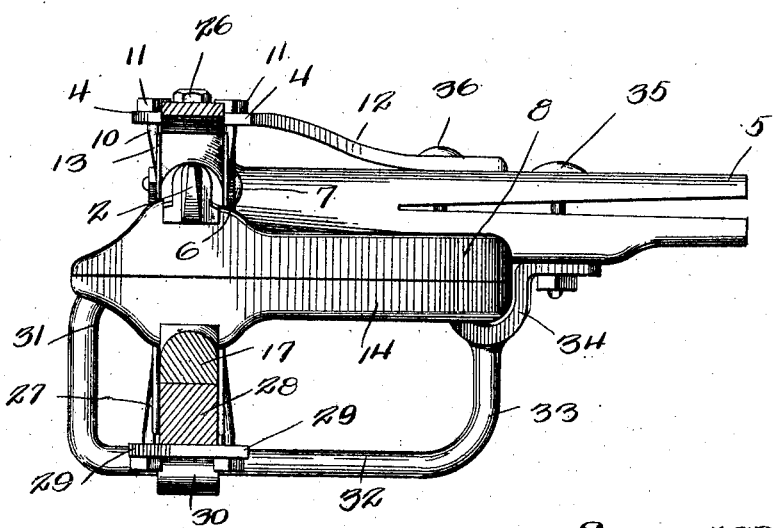
Witnesses
Frederick L. Fox.
Chas. C. Richardson
Inventor
Samuel C. Baucum
By Victor J. Evans
Attorney
THE NORRIS PETERS CO., WASHINGTON, D. C.

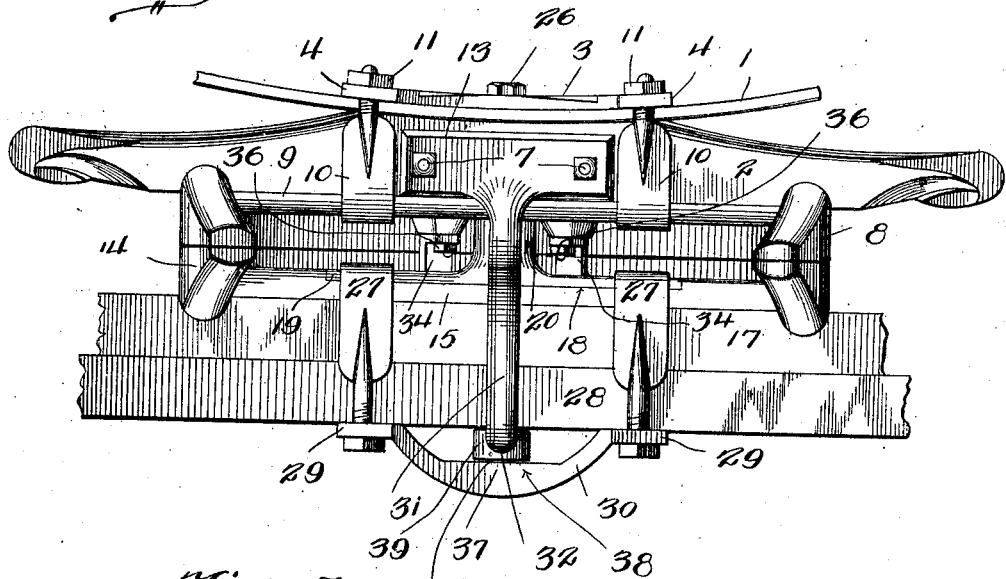
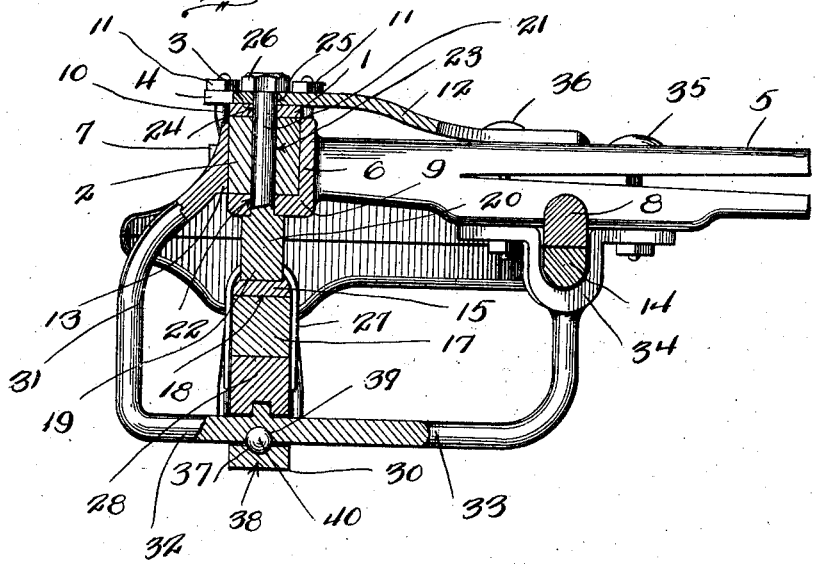

S. C. BAUCUM.
ANTIFRICTION FIFTH WHEEL.
APPLICATION FILED AUG. 9, 1910.

976,620.

Patented Nov. 22, 1910.

3 SHEETS—SHEET 3.

Witnesses
Frederick L. Fox.
Chas. C. Richardson.

Inventor
Samuel C. Baucum.
By Victor J. Evans
Attorney

UNITED STATES PATENT OFFICE.

SAMUEL C. BAUCUM, OF McALESTER, OKLAHOMA, ASSIGNOR OF ONE-HALF TO JOHN GRACE, OF McALESTER, OKLAHOMA.

ANTIFRICTION FIFTH-WHEEL.

976,620.

Specification of Letters Patent.    Patented Nov. 22, 1910.

Application filed August 9, 1910. Serial No. 576,326.

*To all whom it may concern:*

Be it known that I, SAMUEL C. BAUCUM, a citizen of the United States, residing at McAlester, in the county of Pittsburg and State of Oklahoma, have invented new and useful Improvements in Antifriction Fifth-Wheels, of which the following is a specification.

This invention relates to new and useful improvements in fifth wheels for vehicles or other like conveyances and has for one of its objects to provide a device of the class mentioned providing for the front axle, a central ball bearing pivotal seat and a pair of segmental guiding sections which are so constructed and braced as to eliminate practically all friction from the same when the said vehicle or conveyance is unevenly weighted.

Another object of this invention is the production of a device for the purpose disclosed, providing a novelly constructed king bolt, which can be readily attached to the front axle of a vehicle or the like without the necessity of boring a hole therein for the reception of the same which would consequently weaken the said axle.

A further object of this invention is to provide a fifth wheel which will be comparatively simple in construction, cheap to manufacture, and which will comply with all the necessary requirements of such a device.

With these and other objects in view this invention consists in certain novel formations, combinations and arrangements of parts to be hereinafter more fully described, claimed and illustrated in the accompanying drawing, in which:—

Figure 5:
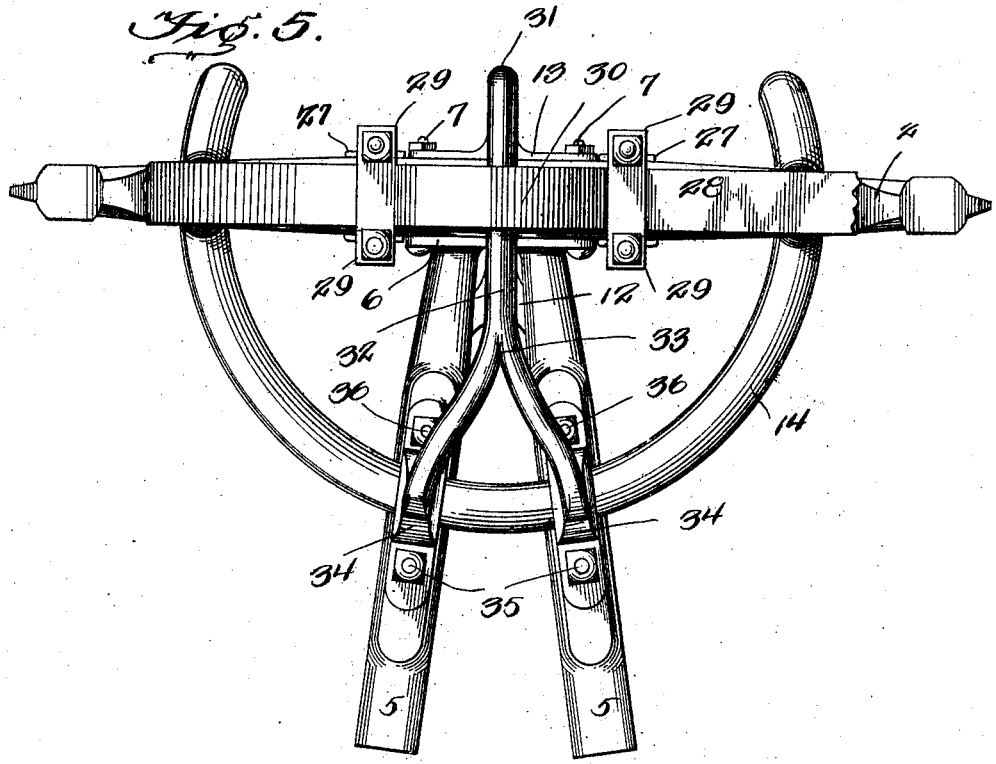
Figure 6:
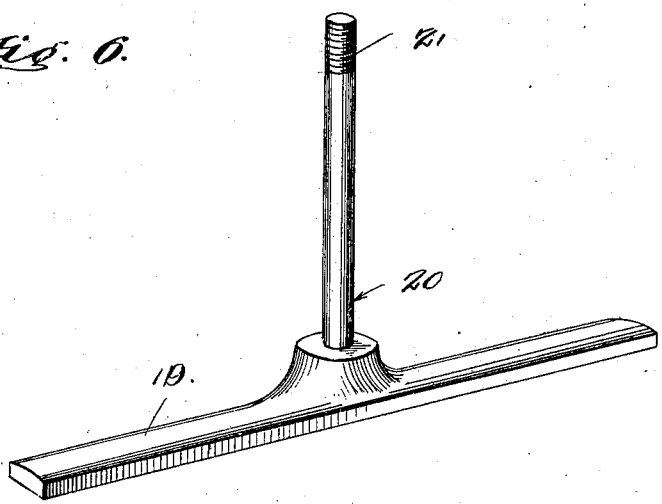

Figure 1 is a top plan view of my improved fifth wheel. Fig. 2 is a side elevation of the same. Fig. 3 is a rear elevation. Fig. 4 is a vertical longitudinal sectional view thereof. Fig. 5 is a bottom plan view. Fig. 6 is a detail perspective view of the king bolt.

Referring to the drawings by characters of reference the numeral 1 designates a fragment of the front springs of a vehicle (not shown) which is retained upon the head-block 2 by means of an overlying clamping plate 3, the opposite ends of which are provided with laterally extending apertured offset ends 4.

A pair of diverging sockets 5 for the reception of the reach bars (not shown) extend integrally from a plate 6 secured to the forward side of the head-block 2 by bolts or other fastenings 7, and have formed integrally upon their under sides the upper segmental section 8 of the fifth wheel. A transverse plate which is an integral part of the plate 6 connects the ends of the segmental section 8 and is clamped to the under side of the head-block 2 by U-shaped clips or straps 10, the upper threaded ends of which pass through the apertured ends 4 of the clamping plate 3 and receive retaining nuts 11.

The clamping plate 3 is provided with a forwardly extending bifurcated bracing arm 12 the outer ends of which are secured to the diverging extensions 5. The bolts 7 which secure the plate 6 to the front of the head block 2 pass through the same and through apertures formed in the opposite ends of a plate 13 and secure the said plate to the rear side of the head-block.

The lower segmental section 14 of the fifth wheel is adapted to underlie the upper section 8 and is connected at its ends by a transverse plate 15 which rests upon the axle bed 17. A recess or seat 18 is formed within the upper face of the plate 15 and receives the cross head 19 of a T-shaped king bolt 20 the upper end of which is reduced and threaded as at 21 and adapted to pass through openings 22, 23, 24 and 25 formed in the plate 9, head block 2, front springs 1 and clamping plate 3 respectively and receive upon its threaded end a suitable nut 26. U-shaped straps or clips 27 serve to hold the cross head 19 within the socket 18 and pass around the plate 15, axle bed 17, front axle 28 and through apertured ears 29 formed upon the ends of a bowed plate 30 and prevent any displacement of the several parts from their normal positions.

A yoke 31 extends downward from the plate 13 and then forwardly as at 32 between the plate 30 and front axle 28, terminating in a forked outer end 33, the ends of which are bifurcated as at 34 and secured upon either side of the lower segmental section 14 by bolts 33 and 36. The bolts 36 pass through the socketed extensions 5 and reach bars (not shown) while the bolts 35 not only pass through the socketed extensions and reach bars, but through the outer ends of the bracing arm 12 and securely connect them with the said extensions. The bowed plate 30 is provided at its intermediate point which lies directly under the king bolt 20, with the lower half 37 of a ball seat 38 while the forwardly extending portion 32 of the yoke 31 is provided with the other half 39 of the said ball race. A ball 40 is located within the seat and forms a pivotal rest or support for the axle.

From the foregoing disclosure it is evident that a fifth wheel is produced which is durable and so constructed as to fulfil all of the necessary requirements of a device for the purposes hereinbefore disclosed.

Having thus fully described the invention, what I claim as new, is:—

1. A device for the purposes disclosed comprising a pair of segmental sections one of which is adapted to overlie the other section, plates connecting the ends of the segmental sections, one plate being secured to the head block of a wagon, the other being secured to the axle an axle bed of a wagon, and a yoke one end of which is secured to the upper segmental section and the other end to the head block extending under the axle and providing a ball bearing support for the same.

2. A device for the purposes disclosed comprising a pair of segmental sections one of which is adapted to overlie the other section, plates connecting the ends of the sections, one plate being secured to the head block of a wagon, a clamping plate adapted to overlie the head block and clamp therebetween the spring of the wagon, offset apertured ears formed upon the ends of the clamping plates, U-shaped bands or clips securing the clamping plate and one connecting plate to the head block, an L plate extending from one of the connecting plates, socketed extensions projecting from the L plate and forming an integral brace for one segmental section, an arm extending from the clamping plate and connected to the socketed extensions to form a brace for the same, the connecting plate for the other segmental section being secured to the axle and axle bed by means of U bands or clips and a yoke secured to one segmental section and extending under the axle to provide a ball bearing support for the same.

3. A device for the purposes disclosed comprising a pair of segmental sections one of which is adapted to overlie the other section, plates connecting the ends of the sections one of which is secured to the head block of a wagon, a clamping plate adapted to overlie the head block and clamp therebetween the front springs of the wagon, apertured ears formed upon the ends of the clamping plate, U-shaped bands or clips securing the clamping plate and one of the connecting plates to the head block, an L plate extending from one of the connecting plates vertically adjacent the side of the head block, socketed extensions projecting from the L plate and forming an integral brace for one segmental section, an arm extending from the clamping plate and connecting with the socketed extensions to form a brace for the same, the connecting plate for the lower segmental section adapted to rest upon the axle bed of the wagon, a bowed plate secured to the under side of the axle of the wagon, apertured ears formed upon the ends of the plate, U bands or clips securing the connecting plate of the lower segmental section and the bowed plate to the axle and axle bed, a king bolt, the head of which is seated in a recess formed in the lower connecting plate, extending upward through apertures located in the upper connecting plate, head block, springs, and clamping plate, a nut upon the end of the king bolt to hold the several parts against displacement, and a yoke extending downward from a plate connected with the L plate upon the opposite side of the head block, under the axle and forward to the socketed extensions and forming a ball bearing rest or support for the axle of the wagon.

4. In a device for the purpose described, the combination of upper and lower superposed segmental sections, upper and lower plates connecting the ends of the sections, the upper plate underlying the head block of a wagon, an upper clamping plate overlying the head block and clamping therebetween the front springs of a wagon, apertured ears formed upon the ends of the clamping plate, U-shaped bands or clips securing the clamping plate, upper connecting plates, and wagon springs to the head block, an L-plate extending from the upper connecting plate vertically and bearing against the forward side of the head block, diverging socketed extensions projecting from the L-plate and forming an integral brace for the upper segmental section and also a support for the reaches of the wagon, a bifurcated arm extending from the upper clamping plate and connected to and bracing the socketed extensions, the lower connecting plate overlying the axle-bed of the wagon, a bowed lower clamping plate underlying the axle of the wagon, apertured ears extending from the ends of the lower bowed clamping plate, a T-shaped king bolt extending upward through apertures located in the upper connecting plate, head blocks, wagon springs, and clamping plates, a nut upon the end of the king bolt for the purpose of holding the several parts against displacement, the cross head of the king bolt being seated in a recess formed in the upper face of the lower connecting plate, U bands or clamps extending over the ends of the head of the king bolt and through the apertured ears of the lower bowed clamping plate and securing the same within its seat or recess, a plate secured to the L plate upon the opposite side of the head block and a yoke extending downward, between the axle and bowed plate, then upward to form a ball bearing seat or rest for the axle and brace for the segmental sections.

In testimony whereof I affix my signature in presence of two witnesses.

SAMUEL C. BAUCUM.

Witnesses:
 TAL MILLWEE,
 ROBT. N. MCMILLEN.